US006763342B1

(12) United States Patent
Mattern et al.

(10) Patent No.: US 6,763,342 B1
(45) Date of Patent: Jul. 13, 2004

(54) SYSTEM AND METHOD FOR FACILITATING INTERACTION WITH INFORMATION STORED AT A WEB SITE

(75) Inventors: Bridget T. Mattern, Huntsville, AL (US); Betsy Leigh, Owens Crossroads, AL (US); Gordon Streeter, Madison, AL (US); Peter A. Kiss, Huntsville, AL (US)

(73) Assignee: Sentar, Inc., Huntsville, AL (US)

( * ) Notice: Subject to any disclaimer, the term of this patent is extended or adjusted under 35 U.S.C. 154(b) by 525 days.

(21) Appl. No.: 09/614,284

(22) Filed: Jul. 12, 2000

Related U.S. Application Data

(63) Continuation-in-part of application No. 09/357,785, filed on Jul. 21, 1999, now Pat. No. 6,484,155.
(60) Provisional application No. 60/093,522, filed on Jul. 21, 1998.

(51) Int. Cl.[7] .............................................. G06F 17/00
(52) U.S. Cl. ............................. 706/46; 706/45; 706/59; 706/60
(58) Field of Search .............................. 706/45, 47, 46, 706/50, 60, 59, 53, 61; 705/27, 1; 707/1, 3, 5; 704/1; 716/19

(56) References Cited

U.S. PATENT DOCUMENTS

| | | | | |
|---|---|---|---|---|
| 4,866,634 A | * | 9/1989 | Reboh et al. | 706/60 |
| 5,175,800 A | * | 12/1992 | Galis et al. | 706/45 |
| 5,295,230 A | * | 3/1994 | Kung | 706/59 |
| 5,406,477 A | * | 4/1995 | Harhen | 703/6 |
| 5,519,633 A | * | 5/1996 | Chang et al. | 716/19 |
| 5,546,321 A | * | 8/1996 | Chang et al. | 716/1 |
| 5,628,011 A | * | 5/1997 | Ahamed et al. | 707/10 |
| 5,644,686 A | * | 7/1997 | Hekmatpour | 706/45 |
| 5,696,885 A | * | 12/1997 | Hekmatpour | 706/59 |
| 5,720,007 A | * | 2/1998 | Hekmatpour | 706/50 |

(List continued on next page.)

FOREIGN PATENT DOCUMENTS

| | | | | |
|---|---|---|---|---|
| WO | WO 00/57302 | * | 9/2000 | G06F/17/30 |

OTHER PUBLICATIONS

Stolze, M., "From External Requirements to Appropriate Knowledge Representations: A Case Study", Proceedings of the 10th Conference on AI for Applications, Mar. 1994, pp. 156–162.*

Mylopoulos et al., "KNOWBEL: A Hybrid Expert System Building Tool", Proceedings of the 2nd International IEEE Conference o Tools for AI, Nov. 1990, pp. 864–870.*

(List continued on next page.)

*Primary Examiner*—Ramesh Patel
*Assistant Examiner*—Kelvin Booker
(74) *Attorney, Agent, or Firm*—Lee & Hayes, PLLC; Lanier Ford Shaver & Payne P.C.

(57) ABSTRACT

Described is a system and method for facilitating interaction with information or knowledge. In one aspect, a knowledge-building component captures knowledge or information and stores it in a knowledge module. The knowledge module is attached to either a Web site or individual Web pages or documents within the Web site. The content and structure of the knowledge module determines the interactive functionality provided to the end user of the Web site. In another aspect, a knowledge serving component facilitates interaction with the information or knowledge. The knowledge serving component provides a user machine with alternative interactions. The knowledge serving component uses selections made by the user machine and the content of the knowledge module to direct the user machine to a specific piece of knowledge or information contained within a site.

10 Claims, 6 Drawing Sheets

U.S. PATENT DOCUMENTS

| | | | | |
|---|---|---|---|---|
| 5,806,056 | A | * | 9/1998 | Hekmatpour .................. 706/50 |
| 5,809,493 | A | * | 9/1998 | Ahamed et al. ............... 706/52 |
| 5,822,745 | A | * | 10/1998 | Hekmatpour ................. 706/59 |
| 5,870,768 | A | * | 2/1999 | Hekmatpour ............ 715/501.1 |
| 5,878,406 | A | * | 3/1999 | Noyes ......................... 706/55 |
| 5,899,985 | A | * | 5/1999 | Tanaka ........................ 706/45 |
| 5,930,154 | A | * | 7/1999 | Thalhammer-Reyero ..... 703/11 |
| 5,995,955 | A | * | 11/1999 | Oatman et al. ............... 706/50 |
| 6,035,283 | A | * | 3/2000 | Rofrano ........................ 705/27 |
| 6,182,068 | B1 | * | 1/2001 | Culliss .......................... 707/5 |
| 6,243,396 | B1 | * | 6/2001 | Somers ....................... 370/469 |
| 6,275,817 | B1 | * | 8/2001 | Reed et al. ................... 706/45 |
| 6,278,987 | B1 | * | 8/2001 | Reed et al. ................... 706/45 |
| 6,289,513 | B1 | * | 9/2001 | Bentwich .................... 717/106 |
| 6,457,009 | B1 | * | 9/2002 | Bollay ......................... 707/10 |
| 6,498,921 | B1 | * | 12/2002 | Ho et al. .................... 434/362 |
| 6,510,406 | B1 | * | 1/2003 | Marchisio ..................... 704/9 |
| 6,539,377 | B1 | * | 3/2003 | Culliss .......................... 707/5 |
| 6,578,022 | B1 | * | 6/2003 | Foulger et al. ............... 706/45 |
| 6,601,055 | B1 | * | 7/2003 | Roberts ....................... 706/45 |
| 2001/0039493 | A1 | * | 11/2001 | Pustejovsky et al. ........ 704/235 |
| 2001/0047270 | A1 | * | 11/2001 | Gusick et al. ................. 705/1 |
| 2001/0047355 | A1 | * | 11/2001 | Anwar .......................... 707/5 |
| 2001/0049688 | A1 | * | 12/2001 | Fratkina et al. .......... 707/104.1 |
| 2002/0004764 | A1 | * | 1/2002 | Stolze et al. .................. 705/27 |
| 2002/0010709 | A1 | * | 1/2002 | Culbert et al. .............. 707/500 |
| 2002/0049705 | A1 | * | 4/2002 | Haviv-Segal et al. .......... 707/1 |
| 2002/0049707 | A1 | * | 4/2002 | Townsley ...................... 707/1 |
| 2002/0072970 | A1 | * | 6/2002 | Miller et al. ................. 705/14 |
| 2002/0128943 | A1 | * | 9/2002 | Schreckengast et al. ...... 705/36 |
| 2003/0130973 | A1 | * | 7/2003 | Sumner et al. ............... 706/45 |

OTHER PUBLICATIONS

Swaby, P.A., "A Graphical Expert System for Microfossil Identification for Use in The Petroleum Industry", IEE Colloquium on A in the User Interface, Apr. 1990, pp. 6/1–6/7.*

Lam et al., "A Graphical Interface for an Object–Oriented Query Language", Proceedings of the 14$^{th}$ Annual International Computer Software and Applications Conference, Oct. 1990, pp. 231–237.*

Daniel III, et al., "Kno–Web—A Knowledge Web for Large–Scale Evolving Distributed Knowledge Resources", IEEE Informatio Technology Conference, Sep. 1998, pp. 75–78.*

* cited by examiner

SYSTEM AND METHOD FOR FACILITATING INTERACTION WITH INFORMATION STORED AT A WEB SITE

RELATED APPLICATIONS

This application claims priority from and is a Continuation-In-Part of prior application Ser. No. 09/357,785, filed Jul. 21, 1999, now U.S. Pat. No. 6,484,155, which in turn is a Non-Provisional Patent Application based on Provisional Patent No. 60/093,522, filed on Jul. 21, 1998, and entitled Knowledge Web for Large-Scale Evolving, Distributed Knowledge Resources.

GOVERNMENT CONTRACTS

This invention was made with Government support under contract DASG60-98-C-0104 awarded by the U.S. Army Space and Missile Defense Command. The Government has certain rights in the invention.

FIELD OF THE INVENTION

The present invention relates to knowledge-based systems. More specifically, the invention relates to the integration of knowledge-based systems with network-accessible interactive documents.

BACKGROUND OF THE INVENTION

It is often said that we are drowning in information, but starved for knowledge. There is a vast amount of information available over the Internet, and, indeed, even on company intranets and networks. Most often, however, that information is not accessible in an efficient manner. Users that desire an answer to a question or problem are forced to manually sift through scores of data, often times without finding the answer. Part of the problem is that there are no existing mechanisms that satisfactorily make information available in a usable manner. Rather, information is simply stored, and may even be categorized. However, if an individual is in search of some information or knowledge, that individual is essentially left to conduct queries, analyze the result of the query, and formulate his own new query in search of the information, mostly done manually.

In some circumstances, the individual may have access to a database that includes summaries of information stored at a location, such as a Web site. One example of such a system is the typical Internet search engine. The individual typically accesses an Internet search engine and provides a simple word-search query. The conventional search engine queries its databases, and returns summaries of those documents that include the words used in the search. Usually such a search returns very many summaries, most of which are unusable and unrelated to solving the individual's problem. Unfortunately, the individual has no recourse but to sift through the search results in an attempt to identify the document that contains the solution. Existing information technologies do not provide the individual with access to experts that may be able to assist with the search for a solution by guiding the individual through a systematic search through the information while avoiding information that is unrelated to the individual's ultimate goal.

Thus, as is readily appreciated, it is inefficient and cumbersome to access information or knowledge stored at a Web site or intranet by merely performing simple word-search queries and manually analyzing the results. Unfortunately, that is precisely the current solution to the problem.

SUMMARY OF THE INVENTION

Briefly stated, the present invention overcomes the problems identified above by attaching a knowledge based system (KBS) to a web page, a Web site, or a document, thereby making the site, page, or document content interactive. The invention enables the capture, retention, and interactive-use of knowledge and information associated with the Web site, Web page, or document.

In one aspect of the invention, a knowledge-building component captures knowledge or information and stores the knowledge or information in a knowledge module. The knowledge module is attached to either a Web site or individual Web pages or documents within the Web site. The content and structure of the knowledge module determines the interactive functionality provided to the end user of the Web site. The functionality may include providing a presentation mechanism for the Web site content; enabling an interactive, self-service answer facility; providing easy access to complex content; enabling an interactive, self-service analysis capability that results in a problem solution and a recommendation; and the like.

In another aspect of the invention, a knowledge serving component facilitates the interacting with the knowledge. The knowledge serving component receives from a user machine an identification of a problem, perhaps posed as a question or a set of symptoms. The knowledge serving component may access a knowledge module and present the user machine with questions having alternative replies. The knowledge serving component uses selections made by the user machine and the content of the knowledge module to direct the user machine to a specific piece of knowledge or information contained within a site. One example of the specific piece of knowledge may be a potential recommendation of a piece of medical advice concerning symptoms that a user may be experiencing. The decisions made by and the interactions with the knowledge serving component may be dynamically controlled by the user's interaction with the knowledge.

Yet another aspect of the invention provides a mechanism for locating and interacting with the content provided by a Web site. This aspect of the invention enables an end user to dynamically interact with the web site, thereby "directing" the user to pieces of content desired by interactively specifying responses to selections.

Another aspect of the invention provides a recommendation facility for a user. This aspect enables the user to solicit advice or recommendations via the Web site by "directing" the analysis, on which the advice or recommendation is based, through a dynamic selection and response interaction.

These and other aspects of the invention, together with the benefits and advantages realized, will become apparent from a reading of the following detailed description in conjunction with the drawings, in which:

DETAILED DESCRIPTION

One illustrative knowledge-based system constructed in accordance with the invention may be implemented as a knowledge-based system for facilitating interaction with information stored at a Web site. The several components of the system are described first, followed by a description of the operation of the system through the interaction of the several components. The illustrative system described is but one of many alternative electronic bid/offer purchase transactions that can be implemented in accordance with the invention, and the breadth and scope of the invention is not limited to the particular embodiments described here.

Exemplary Computing Device

Figure 1:
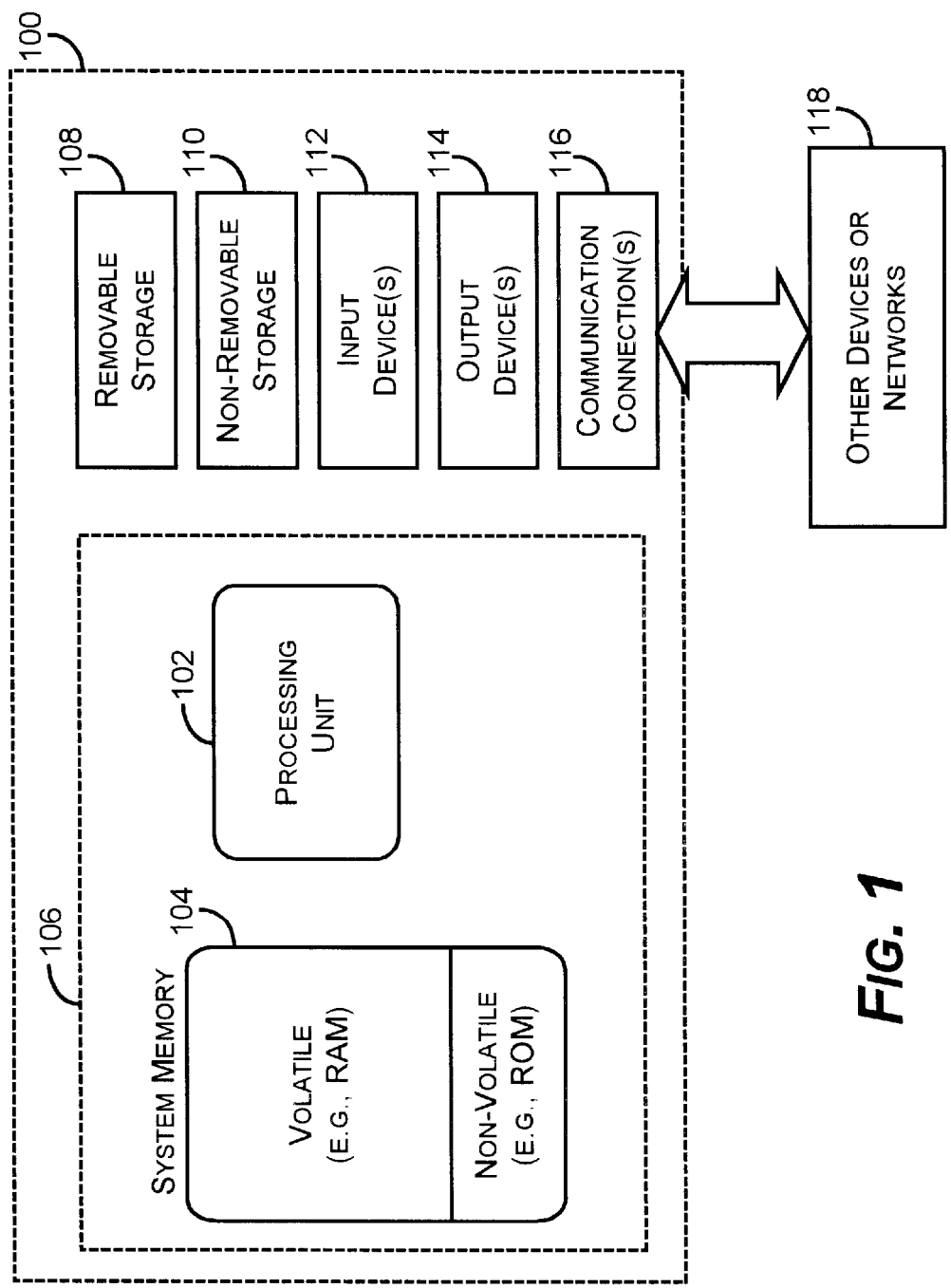
FIG. 1 is a block diagram representing a typical computing device which may be used to implement various aspects of the present invention.

FIG. 1 is a functional block diagram generally illustrating a computing device 100, one or more of which may be adapted for use in the illustrative system implementing the invention as described below. In its most basic configuration, computing device 100 typically may include at least one processing unit 102 and system memory 104. Depending on the exact configuration and type of computing device, system memory 104 may be volatile (such as RAM), non-volatile (such as ROM, flash memory, etc.) or some combination of the two. The basic configuration of the device 100 is illustrated in FIG. 1 within dashed line 106.

Device 100 may also have additional features and functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules, or other data. Memory 104, removable storage 108, and non-removable storage 110 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by device 100. Any such computer storage media may be part of device 100.

Device 100 includes one or more input devices 112 such as a keyboard, mouse, pen, voice input device, touch input device, scanner, or the like. One or more output devices 114 may also be included, such as a video display, audio speakers, a printer, or the like. Input and output devices are well known in the art and need not be discussed at length here.

Device 100 also contains communication connection 116 that allows the device 100 to communicate with other devices 118, such as over a local or wide area network. Communication connection 116 is one example of communication media. Communication media includes any information delivery media that serves as a vehicle through which computer readable instructions, data structures, program modules, or other data may be delivered on a modulated data signal, such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, electromagnetic (e.g., radio frequency), infrared, and other wireless media. The term computer readable media as used herein includes both storage media and communication media.

Illustrative Knowledge-Based System

Figure 2:
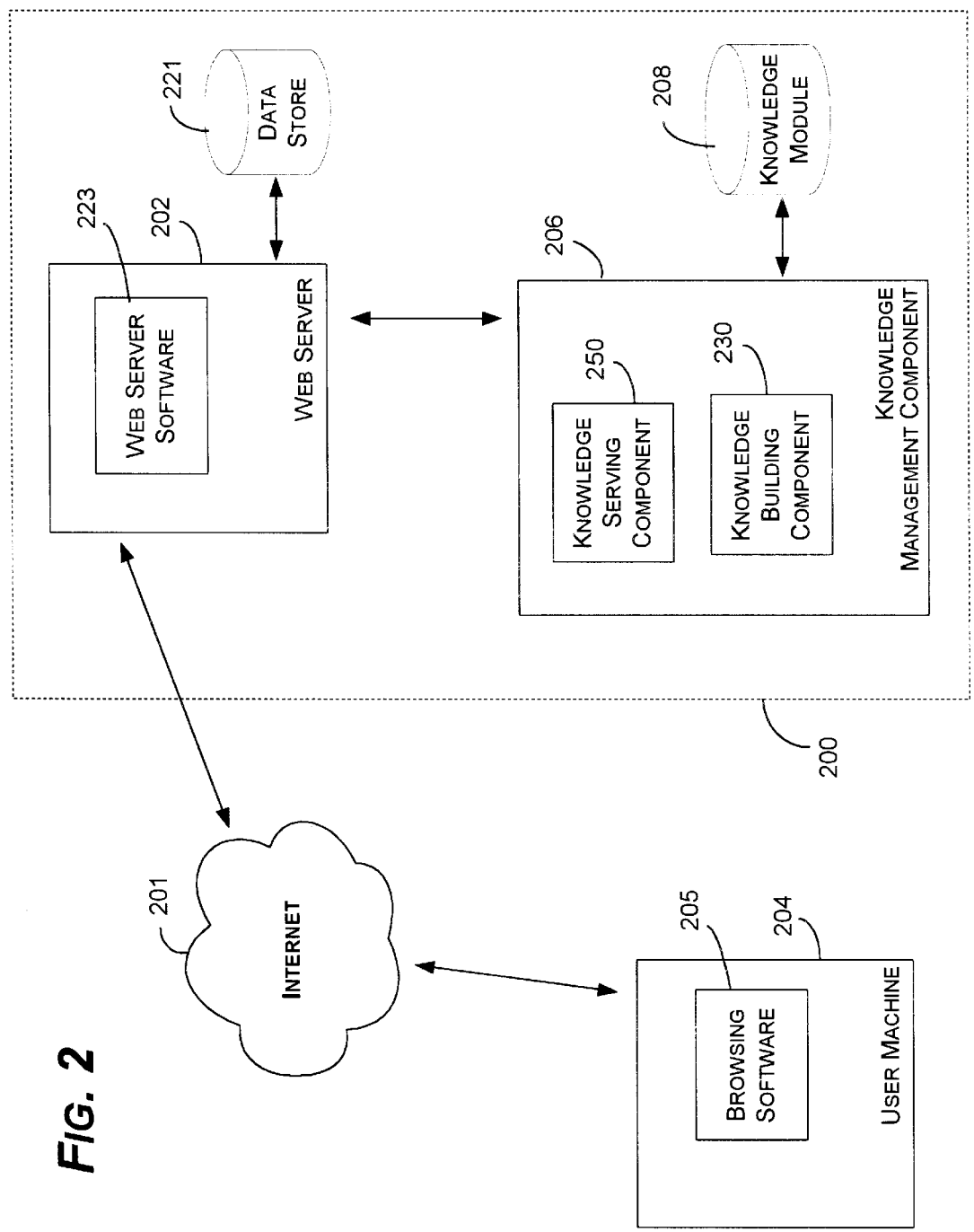
FIG. 2 is a functional block diagram of an illustrative knowledge based system for implementing the present invention.

FIG. 2 is a conceptual overview of one embodiment of a knowledge-based system for facilitating interaction with a Web site constructed in accordance with the present invention. Illustrated is a system 200 including a Web server 202, a user machine 204, a knowledge management component 206, and a knowledge module 208. The knowledge management component 206 includes a knowledge building component 230 and a knowledge serving component 250. Each of those components may be embodied in a computing device such as that described above with respect to FIG. 1. Generally stated, the Web server 202 in combination with the knowledge management component 206 (more specifically, the knowledge serving component 250) assist a user to solve a problem by making available expert domain information in some area of interest. As described more fully below, the knowledge serving component 250 of the knowledge management component 206 allows the Web server 202 to make the information contained in the knowledge module 208 available in an interactive fashion to a user of the user machine 204. In operation, the user machine 204 may establish a connection to the Web server 202 over the Internet 201 to send and receive information back and forth between the user machine 204 and the Web server 202. The information may take the form of problems having corresponding solutions or questions having corresponding answers from both the user machine 204 and the Web server 202. The system 200 allows the user of the user machine 204 to pose a problem to the Web server 202 within the expert domain of the knowledge module 208. By presenting the user with a series of proposed solutions or answers or requests for further information, the knowledge serving component 250 and the Web server 202 act in conjunction to direct the user machine 204 to a solution. This overview of the operation of the system 200 will become more apparent in view of the following discussion of each of the several components of the system 200.

Web Server Component

The Web server 202 acts as the presentation layer of the system 200. The Web server 202 provides an interface to interact with the system 200. The Web server 202 includes Web server software 223 and a data store 221. The Web server software 223 is configured to serve Web pages and documents to other computing devices over the Internet 201. The Web server software 223 is configured to retrieve files and other information from a data store 221 and the knowledge management component 206, and to evaluate and combine the retrieved information to create Web pages that may be served upon request to users of the Internet 201, such as the user machine 204. The Web server software 223 is further configured to receive information that may be provided to the Web pages (e.g., posted) by users interacting with the Web pages served by the Web server 202.

The data store 221 component of the Web server 202 contains files and documents that may be used to construct the Web pages. For instance, the data store 221 may include eXtensible Markup Language (XML) files and information used to construct the Web pages that are served over the Internet 201. In addition, the data store 221 may include applications, scripts, images, or other executable software that may be used to construct the Web pages by combining the XML files with other information, such as other information stored on the data store 221 or information made available by the knowledge management component 206.

Knowledge Building Component

Figure 4:
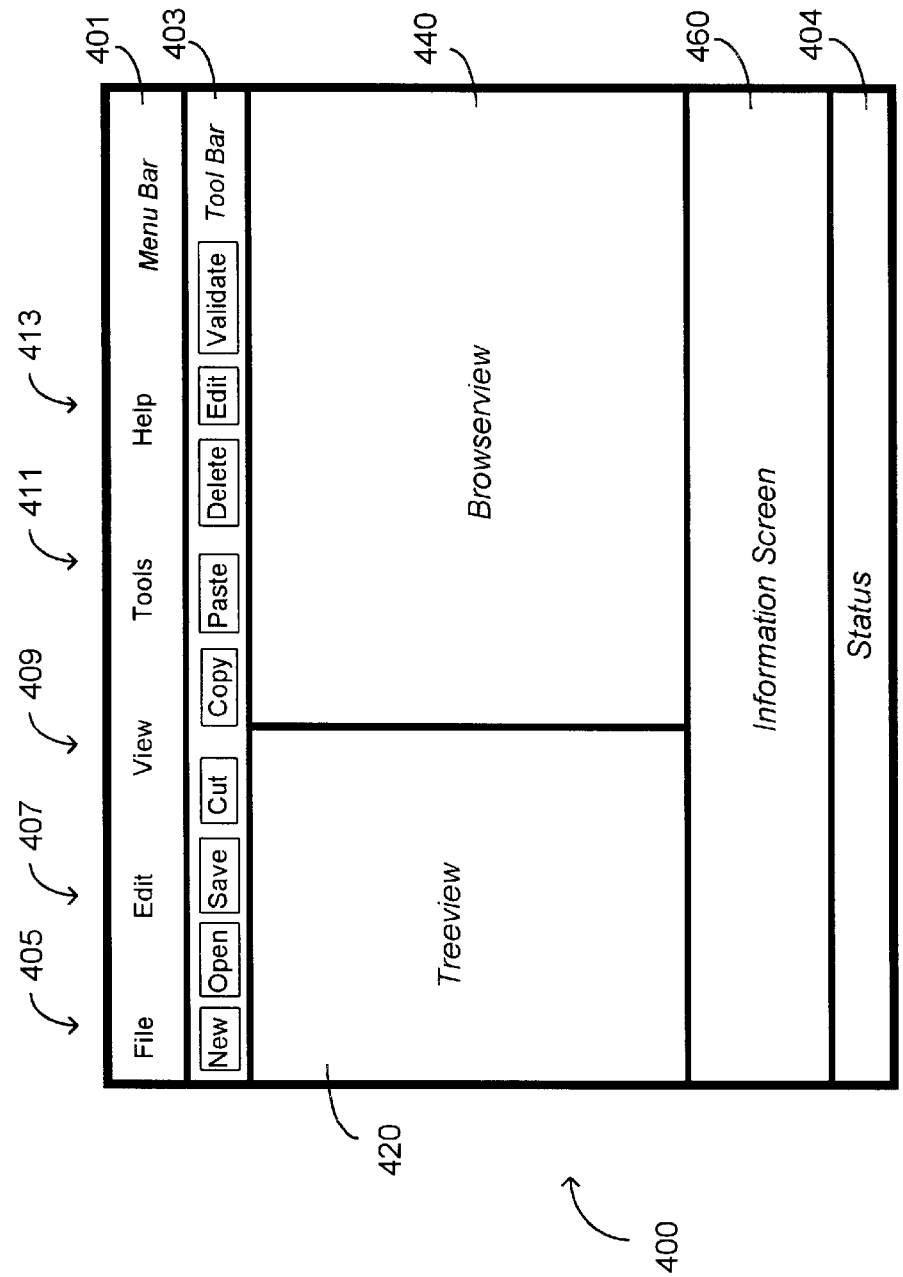
FIG. 4 is an illustrative user interface display that may be presented to a user machine by a knowledge building component in accordance with one aspect of the present invention.

The knowledge building component 230 is used by the system 200 to generate knowledge modules, such as knowledge module 208, in accordance with this implementation of the present invention. The knowledge building component 230 may be accessible via the Internet 201 through the Web server 202, or, alternatively, via conventional input and output mechanisms local to the knowledge management component 206. The knowledge building component 230 of this particular embodiment provides a graphical user interface to create and maintain XML-represented knowledge modules, although many alternative formats for the knowledge modules will become apparent to those skilled in the art. One exemplary graphical user interface presented by the knowledge building component 230 of this embodiment is illustrated in FIG. 4 and described below.

Briefly described, the knowledge building component 230 provides the ability to enter, delete, and modify knowledge, as exemplified by questions, replies, and solutions in a tree structure indicating their relationship. Operationally, the knowledge building component 230 provides the user with the ability to create and maintain a knowledge module containing one or more decision paths. While decision-path based knowledge modules are described with respect to this particular implementation, those skilled in the art will appreciate that the knowledge building component 230 may be configured to create and maintain many other forms of knowledge modules. The user can modify the decision paths by adding, moving, deleting, or altering nodes of the knowledge module 208 as represented in a tree structure. The knowledge building component 230 of the described implementation operates within the constraints described below with respect to the discussion of the knowledge building component user interface. The knowledge building component 230 provides checks to foster the creation of a valid decision tree structure, such as verifying the completeness of a decision tree to detect problems in an invalid knowledge module.

Knowledge Module

The knowledge module 208 contains the expert knowledge related to the information served by the Web server 202. The knowledge module 208 is accessible via the knowledge serving component 250, and is typically created by the knowledge building component 230. In the described embodiment, the knowledge module 208 contains the expert's domain knowledge in the form of related question, reply, and solution information in an XML-based format. Although illustrated in XML-based format here, those skilled in the art will appreciate that many other formats may apply equally. The knowledge module 208 provides the structure and content that drives the behavior of the system 200. As mentioned above, the knowledge module 208 of this implementation is decision-path based, however, other formats may be employed to achieve the same results, such as a rule-based system, predicate logic system, case-based system, neural network, or the like.

Figure 3:
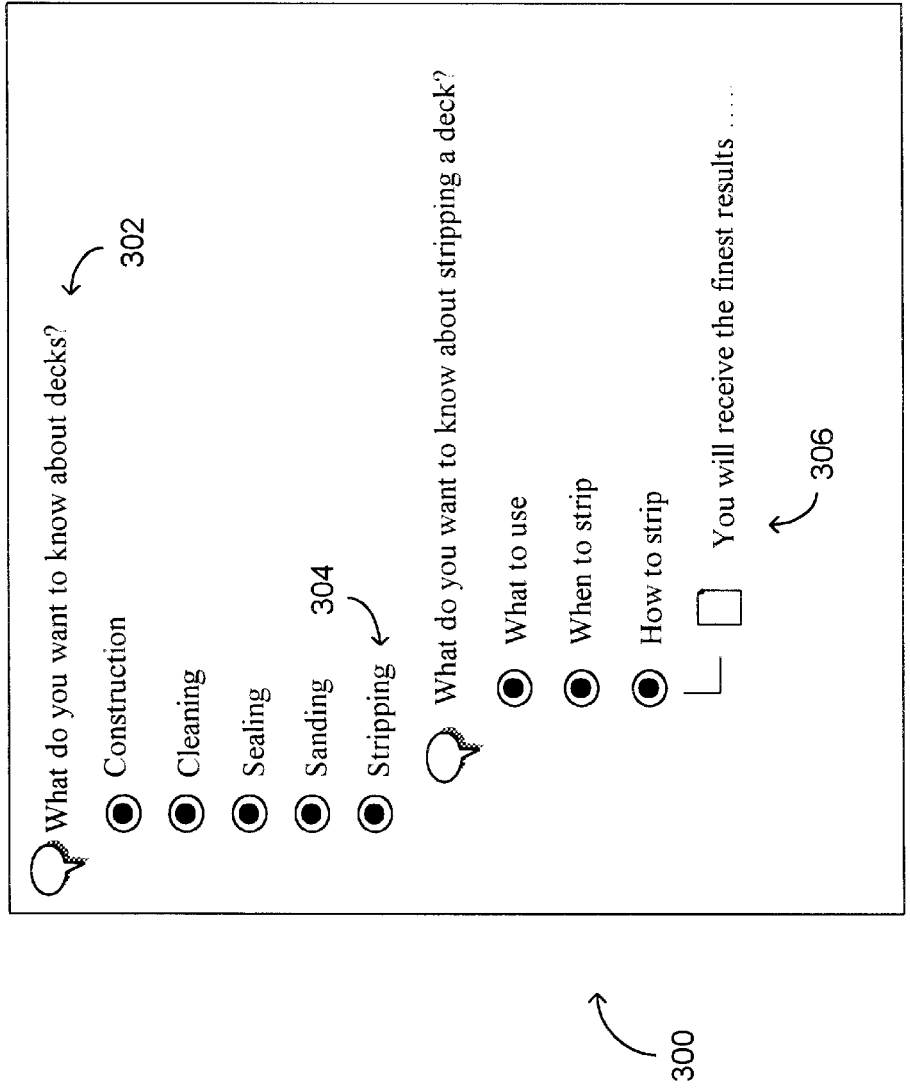
FIG. 3 is a graphical representation of question, reply, and solution nodes that may be incorporated into a knowledge module constructed in accordance with the present invention.

Referring briefly to FIG. 3, illustrated is a sample structure of one exemplary question and answer knowledge module that may be used by the described implementation of the invention. The knowledge module 208 upon which FIG. 3 is based may be constructed using the knowledge building component 230 described above. The knowledge module 208 is represented by a tree structure 300 where each node in the tree 300 is either a question, a reply to a question, a solution to a question, or a "leap." This implementation makes use of leaps in place of a duplicate question node. For instance in the case where two or more separate decision paths include duplicate question nodes, rather than duplicate the question node, a leap is used to redirect other decision paths to one common question node. The nodes with the "?" icon are question nodes (e.g., question node 302), the nodes with the radio button icons are reply nodes (e.g., reply node 304), and the nodes with the page icons are solution nodes (e.g., solution node 306). The root level of the knowledge module tree 300 is a question node 302.

Question nodes indicate questions that are presented to the user machine 204 during the process of gathering information in order to locate and provide an answer to the user. Each question has one or more alternative replies associated with it. Each reply associated with a question may lead to another question or to a solution. A solution is an end node, meaning that nothing follows the solution. In this document, questions, replies, and solutions may sometimes be referred to generically as nodes, indicating their role in the tree structure.

In accordance with this specific implementation of the invention, each knowledge module follows certain criteria. For instance, a complete decision tree in accordance with this implementation meets the following constraints:

The first (root) node in the knowledge module 208 should be a question node. e.g., question node 302. To enforce this constraint, the knowledge building component 230 may not allow the user to enter any node except a question node as the root node.

Any question node should have one or more child reply nodes. To enforce this constraint, the knowledge building component 230 may not allow a question node to have a solution or another question node as a child.

A reply node should have exactly one child node, either a question node or a solution node. To enforce this constraint, the knowledge building component 230 may not allow a reply node to be a child to another reply node.

Every decision path in the decision tree should end in a solution node. A corollary to this constraint is that a complete decision tree should have at least one decision path.

A solution node should not have child nodes. To enforce this constraint, the knowledge building component 230 may not allow a solution node to have children.

A question or reply node should have non-empty question or reply values. Any solution node should have a non-empty solution description value. To enforce this constraint, the knowledge building component will detect blank nodes during validation, and report those to the user to correct.

As mentioned above, leaps may be used to prevent duplication of existing question nodes. For instance, a leap may be used in place of a question node by pointing to an actual question node. The leap redirects the flow of the decision path to the actual question node rather than duplicate the entire subtree. In this manner, the duplication of question nodes and their children may be avoided.

Knowledge Serving Component

The knowledge management component 206 also includes the knowledge serving component 250. The knowledge serving component 250 facilitates communication between the user machine 204, via the Web server 202, and the knowledge module 208. In this embodiment, the knowledge serving component 250 is XML based. The user machine 204 begins a session by connecting to the Web server 202 and posing a question or query within the expert domain served by the Web server 202. The Web server 202 then operates in conjunction with the knowledge serving component 250 to direct the user machine 204 to a solution to the question. To that end, the knowledge serving component 250 retrieves questions, replies, and solutions from the knowledge module 208 in response to the interaction with the user machine 204.

More specifically, the knowledge serving component 250 presents to the user machine 204, via the Web server 202, some representation of selection choices related to the user machine's query. For instance, the knowledge serving component 250 may access the knowledge module 208 to retrieve the question at the root node of the knowledge module 208 associated with the area of interest identified by the user machine 204, with alternative selections related to the root-node question. The knowledge serving component 250 presents that information to the Web server 202 to be transmitted to the user machine 204.

Figure 5:
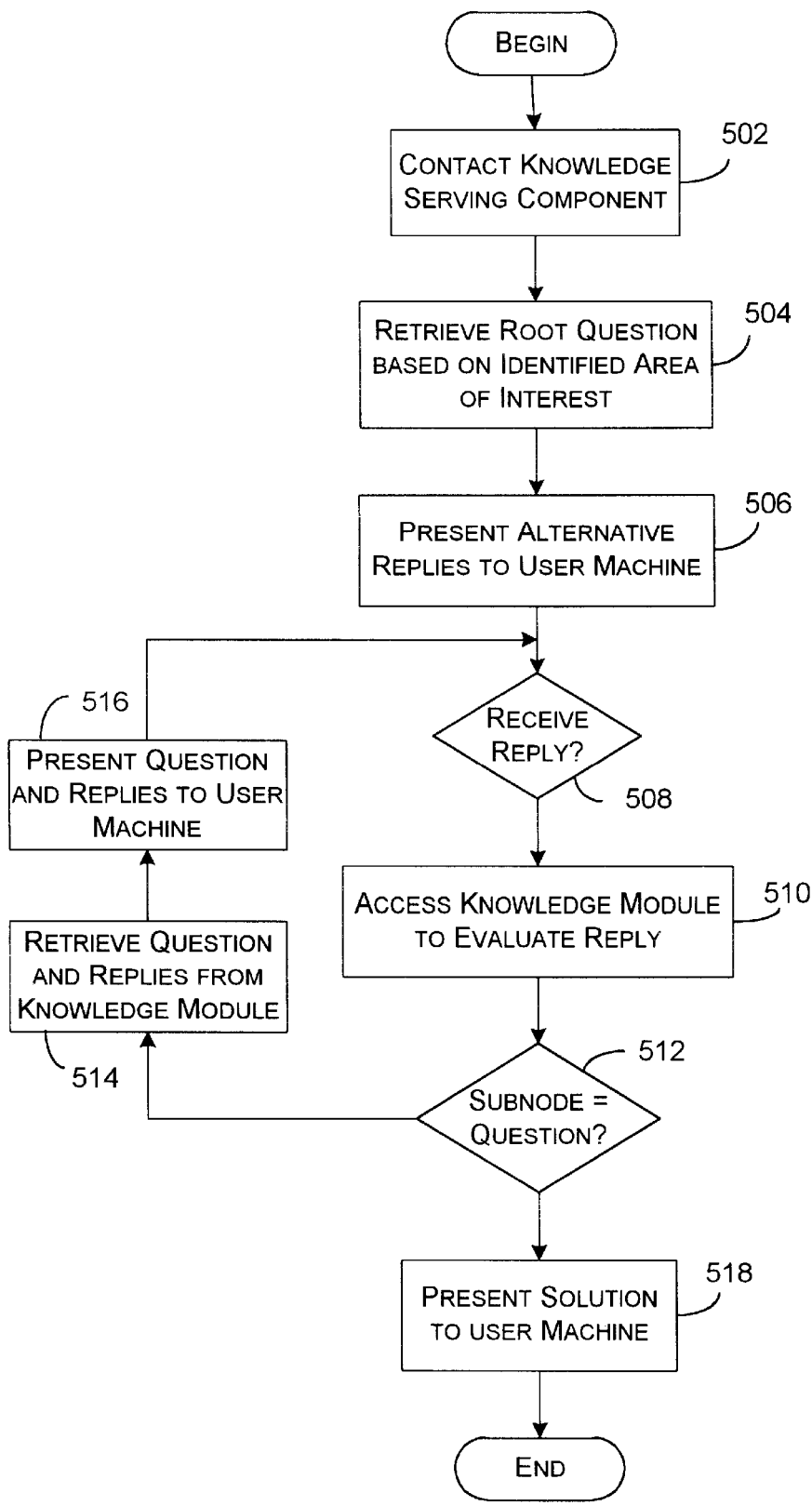
FIG. 5 is a logical flow diagram generally illustrated a process for interacting with expert knowledge in conjunction with documents served by a Web server in accordance with one aspect of the invention.
Figure 6:
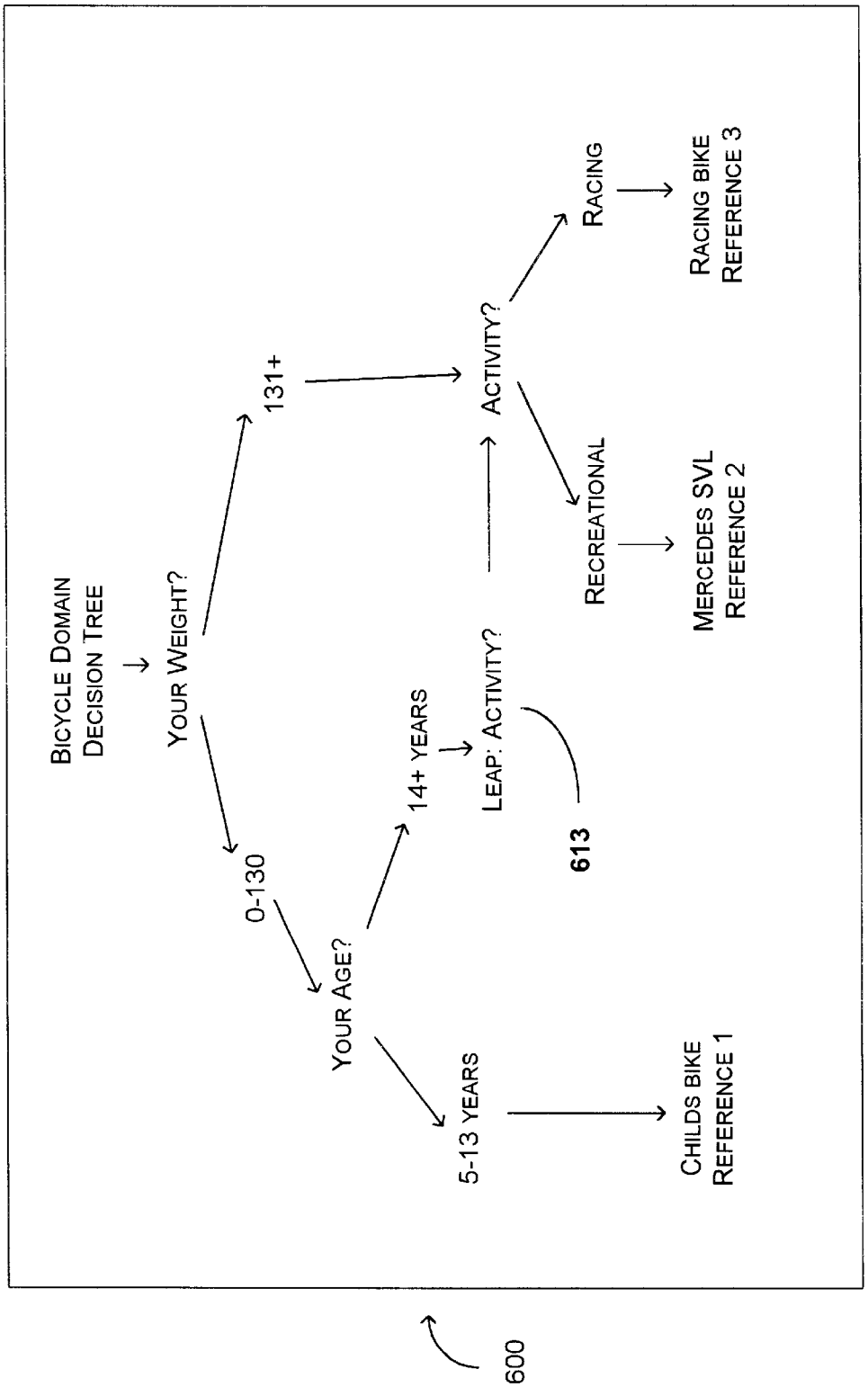
FIG. 6 is a graphical representation of a decision path tree partially representing information stored within a knowledge module constructed in accordance with the present invention.

Once a selection is made from the information presented to the user machine 204, that selection is communicated (via the Web server 202) to the knowledge serving component 250, which interprets the selection and determines the next action by consulting the knowledge module 208. In other words, each reply to a question proceeds down a different decision path having different corresponding next-level question nodes or a solution. Once the next action is determined, the next set of selection choices is communicated to the user, via the Web server 202, by the knowledge serving component 250. This interaction continues until a decision path through the knowledge module 208 is determined to be complete and a solution is communicated to the user machine 204. One example of the interaction of a user with the system 200 to determine a solution to a problem is illustrated in FIGS. 5 and 6, and described below.

Knowledge Building Component User Interface

FIG. 4 is an illustrative user interface that may be presented by the knowledge building component 230 described above. To enable the user to control the knowledge building component 230, the user interface 400 includes a menu bar 401, a toolbar 403, and a status bar 404. The menu bar 401 various pulldown menus, such as a file pulldown menu 405, which contains the following option items: New (creates a new, blank knowledge module), Open (opens a previously saved knowledge module), Save (saves the current state of the active knowledge module to a file), Save As (prompts the user for a filename and saves the knowledge module under that name), Print (allows the user to print the currently displayed knowledge module to a printer or file), Close (closes the currently open knowledge module), Exit (exits the knowledge building component 230). As is typical with user interfaces, if the user attempts to close the knowledge building component 230 when changes to the current knowledge module have not yet been saved, the user will be prompted to save the current knowledge module and may be prompted for a filename.

The Edit pulldown menu of the illustrative user interface 400 includes the following option items: Undo, Cut, Copy, and Paste (used to cut, copy, and paste tree nodes from one position in the tree to another), Delete (deletes a subtree starting at a selected knowledge module question, answer, reply, or leap node), Edit (provides an edit window for the selected question, answer, or reply node), Insert (provides a submenu for inserting a question, answer, or reply node). The options available under the Edit menu item 407 are dependent on the selected node. For example, questions or answers are inserted under replies with no children, while replies are inserted under questions. For a new knowledge module, only a question can be inserted.

The View pulldown menu 409 of the illustrative user interface 400 includes option items to toggle whether the toolbar or status bar are visible. The Tools pulldown menu 411 of the illustrative user interface 400 includes a "Validate Tree" option, which causes the knowledge building component 230 to check the current knowledge module for correctness, highlight any problem nodes in the treeview 420, and print any problem found in the information screen 460. If the user clicks on a validation problem listed in the information view, the associated node will be made visible in the treeview 420. The Help pulldown menu 413 provides the user with access to a help file.

The tool bar contains the following buttons: New, Open, Save, Undo, Cut, Copy, Paste, Delete, Edit, Print, and Validate. Each of these tool bar buttons performs the same functions as the menu bar options described above.

The treeview screen 420 displays the currently open knowledge module. The display may be a standard tree display which can be expanded or contracted by clicking on "+" or "−" buttons visible in the display. Question, reply, and answer nodes have unique icons representing them in the treeview 420. Individual nodes can be selected (highlighted) by clicking on them with the left mouse button. A context menu may be presented by clicking the right mouse button while the cursor is in the treeview area 420. The following menu options are available from the context menu: Insert (a question, answer, reply, or leap node), Delete (a question, answer, or reply node), and Clear Validation Markings. If the validation tool has been run, this menu option returns the view of the currently displayed tree to the unmarked condition. Nodes may be copied or moved to other locations within the tree using well-known drag-and-drop operations.

The browserview 440 displays the currently selected node in the treeview as it will be displayed to the user machine, such as when displayed by the user machine's browsing software 205 (FIG. 2). If the selected node is a question or a reply, the browserview 440 displays the associated question and reply nodes. If the selected node is a solution, the browserview 440 displays the entire text of the answer. Additionally, the browserview 440 may display any images or links included with the solution. The links are displayed using conventional link formatting.

The information screen 460 is used to display informational messages to the user. In particular, the information screen 460 is used to display any validation messages resulting from the validation process described above. By clicking the right mouse button while the cursor is in the information screen area, another context menu may be displayed. Information messages may be recorded in an activity log file or an error log file.

To create a new knowledge module, the user selects the "New" option from the "File" menu 405 on the Menu bar or selects the "New" button from the toolbar. If a knowledge module has already been opened and modified, a warning appears and the user is given the opportunity to save the modified knowledge module before the new knowledge module is created. To open an existing knowledge module, the user selects the "Open" option from the "File" menu 405 or selects the "Open" button on the toolbar. A directory browser may appear so the user can navigate to a desired directory and select the knowledge module. The selected knowledge module is then displayed in the treeview 420.

New nodes may be inserted in the tree structure of a knowledge module by selecting the "Insert" option from the Edit menu 407 or the treeview context menu. In accordance with the illustrative user interface, to insert a node in the knowledge module, the user first selects a node, if one exists (e.g., the knowledge module is not new) in the treeview 420. Then, using the treeview context menu, the toolbar button, or the Edit-Insert menu bar option, the user chooses the type of node to be inserted under the selected node. Invalid choices may be unavailable in the menus. An empty edit window appears, in which the contents of the new node may be typed. The user may then select OK to save the insertion or Cancel to cancel the insertion. The new node then appears in the treeview 420 under the selected node.

To insert multiple reply nodes under a common question node, the user first selects a question node. The reply nodes created are inserted under the selected question node. The user may then use the treeview context menu, the toolbar button, or the Edit-Insert menu bar option to insert a reply under the selected question node. Again, invalid choices may be unavailable in the menus. An empty edit window appears, in which the user may type the contents of the new reply node. A Save/Next option may appear, allowing the user to save this reply node and to create another reply node. The new reply appears in the treeview under the selected question node, and the edit window reappears for insertion of the next reply node. When the last reply node is inserted, the user selects OK rather than Save/Next. At that point, the inserted reply nodes appear in the treeview 420 under the selected question node.

In this specific implementation, new nodes are inserted in accordance with the following guidelines: nodes should be inserted under a selected node; only a question node can be inserted in a new (e.g., empty) knowledge module; only reply nodes can be inserted under a selected (highlighted) question node (any number of reply nodes may be inserted); only one question, one answer, or one leap node may be inserted under a selected (highlighted) reply node; no nodes may be inserted under a selected answer node. The knowledge building component 230 disallows invalid inserts by controlling the availability of the menu options based on the selected node.

Individual knowledge module question, answer, or reply nodes may be edited by selecting (highlighting) a node in the treeview 420 and then selecting the "Edit" option from the Edit menu 407 or by clicking on the "Edit" button on the Tool bar. It should be noted that leap nodes are not edited directly, but rather by editing the question node to which the leap node points. When a node is selected for editing, a pop-up edit window appears with the contents of the selected node. The node may be edited by using the buttons provided on the tool bar of the edit window. Those may include formatting, color, alignment, spellchecking, copy, paste, and cut buttons that behave in a manner consistent with other software applications. Items, such as images and links, may be imported from external sources using the copy and paste functions. When editing is complete, and the "OK" button is selected, the edit window disappears and the changes should be visible in the treeview 420 and browser-view 440 areas.

To delete a node from a knowledge module, the user may first select the intended node in the treeview 420. Then, using the treeview context menu, the Edit-Delete menu bar option, or the Delete button from the toolbar, the user directs the knowledge building component 230 to delete the selected node. A pop-up message may appear asking for confirmation for the Delete. The user may be told how many items under the node will also be deleted with it. Deleting a leap node, however, does not delete its corresponding question node. If the user chooses to continue, the node and any nodes under it should disappear from the treeview 420 under the selected node.

A selected node can be moved on the treeview 420 tree by using the treeview context menu. First, the user navigates the mouse cursor to the node to be moved. By activating the treeview context menu while over the node to be moved, the user may select a "move" option from the treeview context menu. The user may then move the mouse cursor to the desired node location. When the desired node location is highlighted, the user may again activate the treeview context menu and select the move menu option. The node is then moved to the desired location.

A selected node can be copied on the treeview 420 by using traditional drag-and-drop technique. First the user navigates the mouse cursor to the node to be copied and clicks (and holds) a mouse button. The user may then move the mouse cursor (while "dragging" the selected node) to the desired node location. When the desired location is highlighted, the user may release the mouse button and the node is pasted to the desired location.

In this implementation, links to external documents may be added to an answer node. The links may be displayed with the actual link address or may be renamed or aliased to provide the link without displaying the actual address. A user may insert a link in an answer node, by either copying the link from an external source and pasting the link in the edit window, or by typing a link "alias" in the edit window. A pop-up box prompts the user for the link address. In this implementation, links should only be added to answer nodes.

When the user has finished creating or editing a knowledge module, the knowledge module can be saved by either using the Save or Save As options. The Save As option may be selected by choosing the "Save As" option from the "File" pulldown menu on the Menu bar of the main screen. When selected, a Save dialog window will appear. The user can navigate to the appropriate directory and type in the filename. If the filename already exists, the user will be warned. The Save operation may be selected by choosing the "Save" option from the "File" pulldown menu on the Menu or the Save button from the toolbar. When selected, the knowledge module is saved to the current filename, overwriting the previous contents of the file. If the knowledge module has not previously been saved (there is no current filename) the Save will automatically revert to the Save As operation.

Although the knowledge building component 230 has been described here with reference to a specific graphical user interface 400, it will be apparent that many alternative user interfaces are possible that will achieve the same purpose in substantially the same manner as that described. The user interface 400 described here is one example only, and should not be viewed as exhaustive of the user interface elements that may be employed by other embodiments. Similarly, some of those user interface elements depicted in the Figures and described here may be optional and not necessary to a complete user interface.

Operation of the Described Embodiment

FIG. 5 is a logical flow diagram that, in conjunction with FIGS. 2 and 6, generally illustrates a process performed by the illustrative knowledge based system 200 described above to facilitate the interaction of a user machine and expert knowledge maintained in a knowledge module. The process illustrated in FIG. 5 will be explained with reference to an illustrative decision tree (FIG. 6) that may represent a simplified knowledge module used in conjunction with the system (FIG. 2) described above. The process 500 begins when a user machine connects to the Web server 202 to begin a session. The user machine 204 may pose a question to the Web server 202 or simply begin by selecting a domain of knowledge advertised on a Web page served by the Web server 202. The process continues at step 502.

At step 502, the Web server 202 contacts the knowledge serving component 250 to retrieve information related to the area of interest identified by the user machine 204. The Web server 202 may pass a message to the knowledge serving component 250 specifying the area of interest. The process continues at step 504.

At step 504, the knowledge serving component 250 retrieves from the knowledge module 208 the most broad information related to the area of interest identified by the user machine 204. More specifically, in accordance with this specific implementation, the knowledge serving component 250 retrieves the top-level (root node) question from the knowledge module 208. In addition, as described above, the root node question may have one or more reply nodes associated with it. For instance, referring to the sample decision tree of FIG. 6, if the knowledge module 208 relates to the area of bicycles, the root-node question may be "your weight?" Alternative replies under that question node may include less than 130 pounds (0–130) or more than 130 pounds (131+). In that case, the knowledge serving component 250 retrieves from the knowledge module 208 the question (your weight?) and the two alternative replies (0–130, 131+). It should be appreciated that in operation, the knowledge serving component 250 may read into memory 104 (FIG. 1) the entire knowledge module 208 and access the data in memory 104 rather than retrieve information from the knowledge module 208 piece-meal. However, for simplicity, this discussion will describe retrieving information from the knowledge module 208 as the information is needed. The process continues to step 506.

At step 506, the information retrieved from the knowledge module 208 is presented to the user machine 204. More specifically, the knowledge serving component 230 may return the retrieved information to the Web server 202. There, the retrieved information may be assembled with other (page-definition) information stored within the data store 221 to create a Web page that describes the next step along the path to a solution to the user's query. That Web page may then be transmitted to the user machine 204, where it may be presented to the user via browsing software 205. At that point, the process idles at decision block 508 until a reply is received from the user machine 204. When a reply is received at the Web server 202, the process exits proceeds from decision block 508 to step 510.

At step 510, the reply is evaluated and the knowledge module 208 is accessed to retrieve the next node corresponding to the selected reply. In other words, the reply from the user machine 204 identifies one of the alternative replies corresponding to the root question node. Thus, the knowledge module 208 is read to retrieve any subnodes (child nodes) corresponding to the selected reply. For instance, in the example begun above, the user may have selected the reply node indicating that her weight is below 130 pounds. Thus, at step 510, the knowledge serving component 250 reads from the knowledge module 208 the subnodes to the reply node "weight 0–130." The process continues at decision block 512.

At decision block 512, the process determines whether the subnode of the selected reply is another question node or a solution node. As discussed above, a subnode may be another question node, having two or more alternative reply subnodes, or the subnode may be a solution node. Continuing with the example, (referring to FIG. 6) if the user selected the reply node indicating that the user's weight is less than 130 pounds, then the subnode is the question "your age?" and the process proceeds to step 514.

At step 514, the subnode of the selected reply is a question, so the knowledge serving component 250 retrieves the question subnode and any replies associated with the question subnode. Thus, from the knowledge module 208, the knowledge serving component 250 retrieves the question subnode "your age?" having two alternative reply subnodes "5–13 years" and "14+ years." The process continues to step 516, where that information is presented to the user machine 204 as described above with respect to the root question node. The process then repeats as described above, until, at decision block 512 a solution node is encountered.

When, ultimately, a solution is encountered, the process proceeds from decision block 512 to step 518. At step 518, the solution is presented to the user machine. For example, if, referring again to FIG. 6, the user replied that she was over 14 years old, a leap 613 takes the decision path to the question node "activity?," which has reply nodes "recreational" and "racing." Once presented with those alternative replies, the user may select recreational, leading to the solution node "Mercedes SVL." Thus, when that solution node is encountered, the knowledge serving component 250 returns to the Web server 202 that a solution has been achieved, and the value of the solution. The Web server 202 in turn forwards that information to the user machine 204.

In summary, a Web server 202 acts in cooperation with a knowledge management component 206 to make expert knowledge available to a user machine 204. The expert knowledge may be contained within a knowledge module 208, constructed by a knowledge building component 230 and accessible via a knowledge serving component 250. After presenting a problem to the knowledge serving component 250, the user machine 204 is directed to a solution through a series of interactions (e.g., questions and replies, with each reply possibly resulting in another question).

Moreover, as will be appreciated by those skilled in the art, the operation of the particular knowledge based system is based on the structure of the underlying knowledge module content. The illustrative system described above is question and answer oriented, where the questions posed and answers selected guide the user to the content sought. An alternative example of a potential structure for the knowledge module is category and option oriented, where the categories and options provided to the user are structured such that the first level is broad categories and options, and each end-user selection activates a finer granularity of categories and options until the desired content is determined. Other alternative examples of differing kinds of possible structures include directed graphs, non-directed graphs, rule bases, cases, predicate logic, neural networks, and the like.

While the invention is susceptible to various modifications and alternative constructions, certain illustrated embodiments are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. A system for interacting with information stored at a Web site, comprising:

a Web server configured to provide information over a wide area network to a user machine in response to a request from the user machine, the Web server further configured to receive information transmitted to the Web server from the user machine in response to a prompt;

a knowledge building component for constructing knowledge modules, the knowledge building component including a graphical interface for displaying relationships between portions of information and for defining the relationships between the portions of information, the graphical interface being further configured to render a simulated display of the knowledge module being constructed, a knowledge module containing a plurality of nodes, each node in the plurality being either a query node, a response node, or a solution node, each query node having at least one reply node and at least one solution node; and a knowledge serving component configured to present to the Web server a question node retrieved from the knowledge module and at least one reply node associated with the question node, the knowledge serving component being further configured to, in response to a notification from the Web server of a selected reply node if two or more reply nodes are presented to the Web server, retrieve from the knowledge module another node associated with the selected reply node, wherein the knowledge serving component and the Web server interact with the user machine providing question nodes and receiving notice of selected reply nodes until the at least one solution node is retrieved from the knowledge module and presented to the user machine.

2. A computer-implemented method for building a knowledge module, comprising:

presenting a user with a graphical user interface, the graphical user interface having a knowledge representation view capable of displaying a knowledge structure having a plurality of nodes, the graphical user interface further having a browser view capable of simulating a display of the knowledge module as it will appear when rendered on a requesting machine;

creating, in response to an indication from the user through the graphical user interface, a first node in the knowledge structure, the first node having a plurality of associated child nodes in the knowledge structure;

creating, in response to another indication from the user through the graphical user interface, a solution node at some location in the knowledge structure under the first node; and saving the knowledge structure as the knowledge module.

3. The computer-implemented method of claim 2, wherein the first node is a question node and the plurality of associated child nodes comprise reply nodes.

4. The computer-implemented method of claim 3, wherein the knowledge module is represented in an eXtensible Markup Language.

5. The computer-implemented method of claim 2, wherein the knowledge module comprises a directed graph.

6. The computer-implemented method of claim 2, wherein the knowledge module comprises a non-directed graph.

7. The computer-implemented method of claim 2, wherein the knowledge module is rules-based.

8. The computer-implemented method of claim 2, wherein the knowledge module is case based.

9. The computer-implemented method of claim 2, wherein the knowledge module is predicate logic based.

10. The computer-implemented method of claim 2, wherein the knowledge module is neural network based.

* * * * *